United States Patent
Kurino et al.

(10) Patent No.: US 10,551,564 B2
(45) Date of Patent: Feb. 4, 2020

(54) OPTICAL FIBER HOLDER AND OPTICAL FIBER CLEAVING APPARATUS TO WHICH OPTICAL FIBER HOLDER IS ATTACHABLE

(71) Applicant: SEI OPTIFRONTIER CO., LTD., Yokohama-shi, Kanagawa (JP)

(72) Inventors: Shinsuke Kurino, Kanagawa (JP); Hiroshi Takayanagi, Kanagawa (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/429,267

(22) Filed: Feb. 10, 2017

(65) Prior Publication Data

US 2017/0235052 A1 Aug. 17, 2017

(30) Foreign Application Priority Data

Feb. 12, 2016 (JP) ................................. 2016-025134

(51) Int. Cl.
   G02B 6/25 (2006.01)

(52) U.S. Cl.
   CPC ..................................... G02B 6/25 (2013.01)

(58) Field of Classification Search
   CPC ............ G02B 6/25; G02B 2006/12166; G02B 6/4202; B26D 5/16; B26D 1/455; B26D 5/086; B26D 5/12; B26D 5/08; B26D 7/14; B26D 1/45; Y10T 83/8717; Y10T 83/0405
   USPC .......... 83/870; 225/2, 96, 101, 93, 103, 96.5
   See application file for complete search history.

(56) References Cited

U.S. PATENT DOCUMENTS

| 5,024,363 A | * | 6/1991 | Suda ........................ G02B 6/25 225/2 |
| 6,632,027 B1 | * | 10/2003 | Yoshida ............... G02B 6/4202 385/88 |
| 8,480,314 B2 | * | 7/2013 | Saito .................... G02B 6/3862 385/95 |
| 8,506,178 B2 | * | 8/2013 | Takeuchi ................. G02B 6/25 385/100 |
| 8,826,517 B2 | * | 9/2014 | Leyva, Jr. ............ G02B 6/3616 29/700 |

(Continued)

FOREIGN PATENT DOCUMENTS

| JP | H06-51149 A | 2/1994 |
| JP | 2005-249922 A | 9/2005 |

*Primary Examiner* — Ghassem Alie
*Assistant Examiner* — Bharat C Patel
(74) *Attorney, Agent, or Firm* — Drinker Biddle & Reath LLP

(57) ABSTRACT

An optical fiber holder includes a holder main body, a V-groove which is formed on an upper surface of the holder main body and accommodates a first optical fiber, a recessed groove which is formed on a same straight line with the V-groove and accommodates a second optical fiber having a coating portion with a larger outer diameter than the first optical fiber, and an abutting portion which is provided on an end portion of the recessed groove on an opposite side to the V-groove and includes an opening portion which has a smaller width than the recessed groove. When the second optical fiber is accommodated in the recessed groove, a fiber core wire of the second optical fiber protrudes to an outside via the opening portion and an end portion of the coating portion of the second optical fiber abuts on the abutting portion.

2 Claims, 13 Drawing Sheets

(56) References Cited

U.S. PATENT DOCUMENTS

| | | | | |
|---|---|---|---|---|
| 8,861,920 B2* | 10/2014 | Sato | .................... | G02B 6/2553 |
| | | | | 385/137 |
| 9,016,535 B2* | 4/2015 | Hasegawa | ................ | G02B 6/25 |
| | | | | 225/96 |
| 9,488,781 B2* | 11/2016 | Takayanagi | .......... | G02B 6/2553 |
| 9,541,706 B2* | 1/2017 | Morioka | .............. | G02B 6/2555 |
| 9,541,710 B2* | 1/2017 | Sasaki | .................. | G02B 6/3616 |
| 2013/0243385 A1* | 9/2013 | Nguyen | .................. | G02B 6/25 |
| | | | | 385/135 |

* cited by examiner

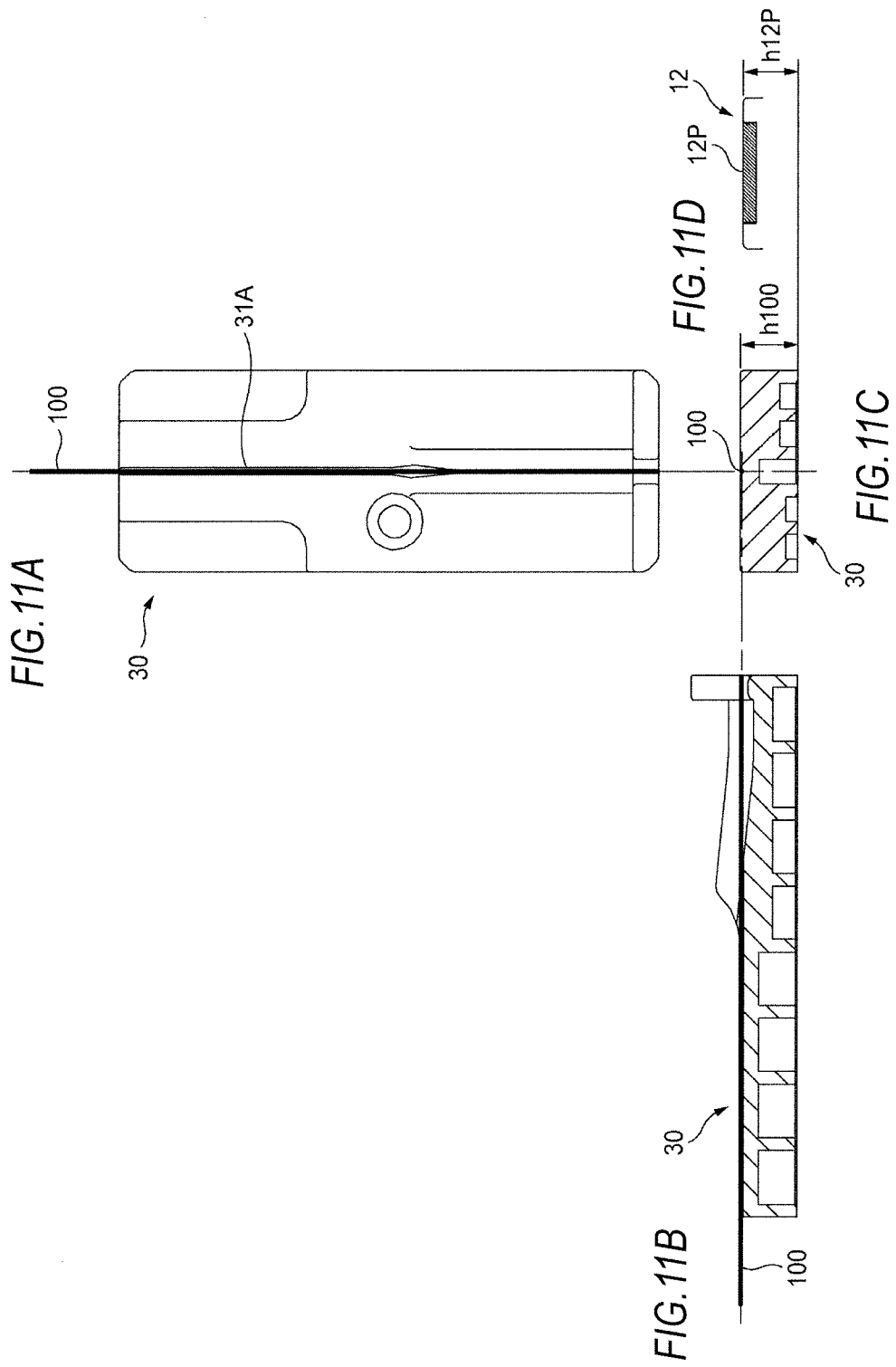

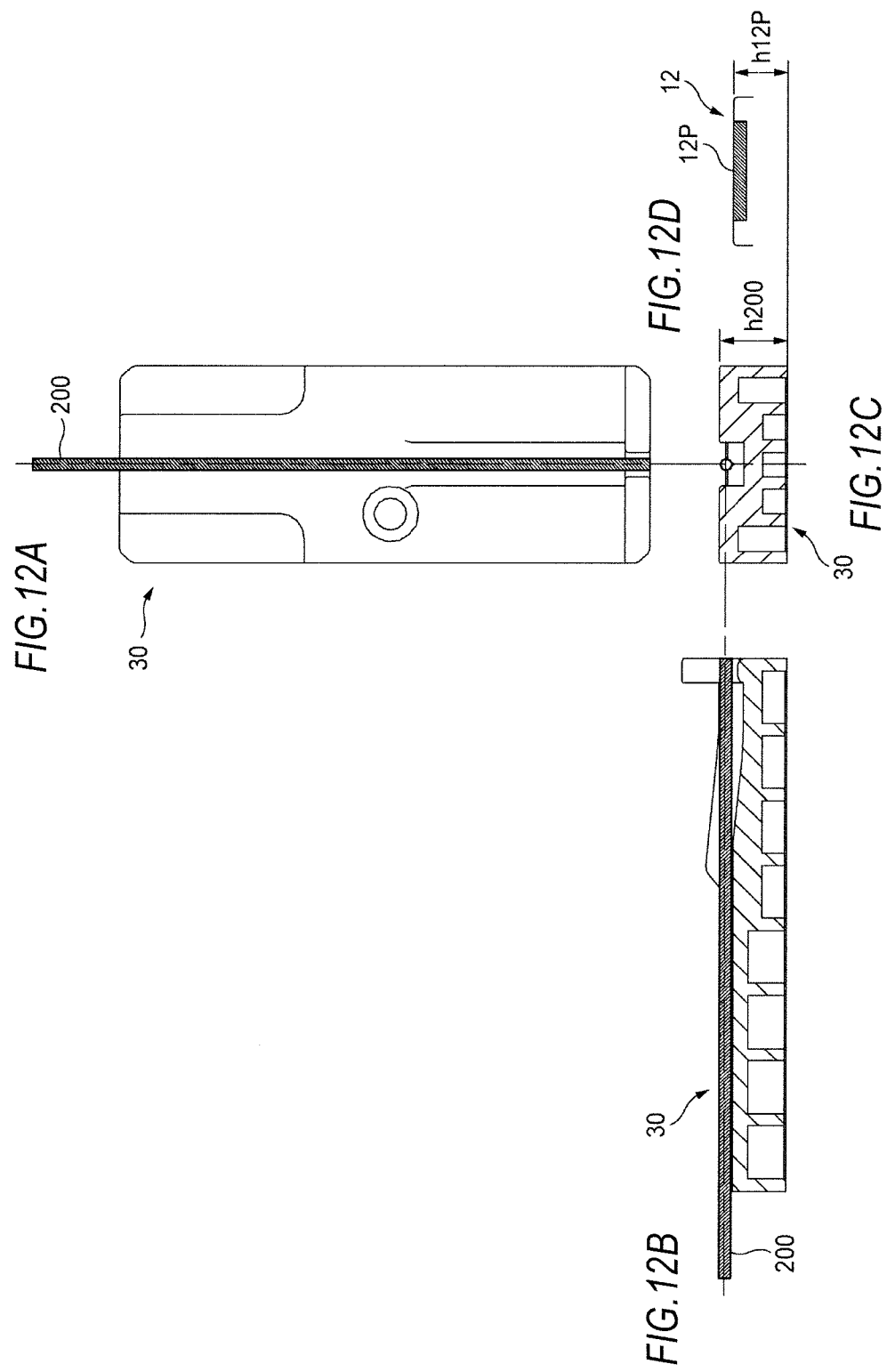

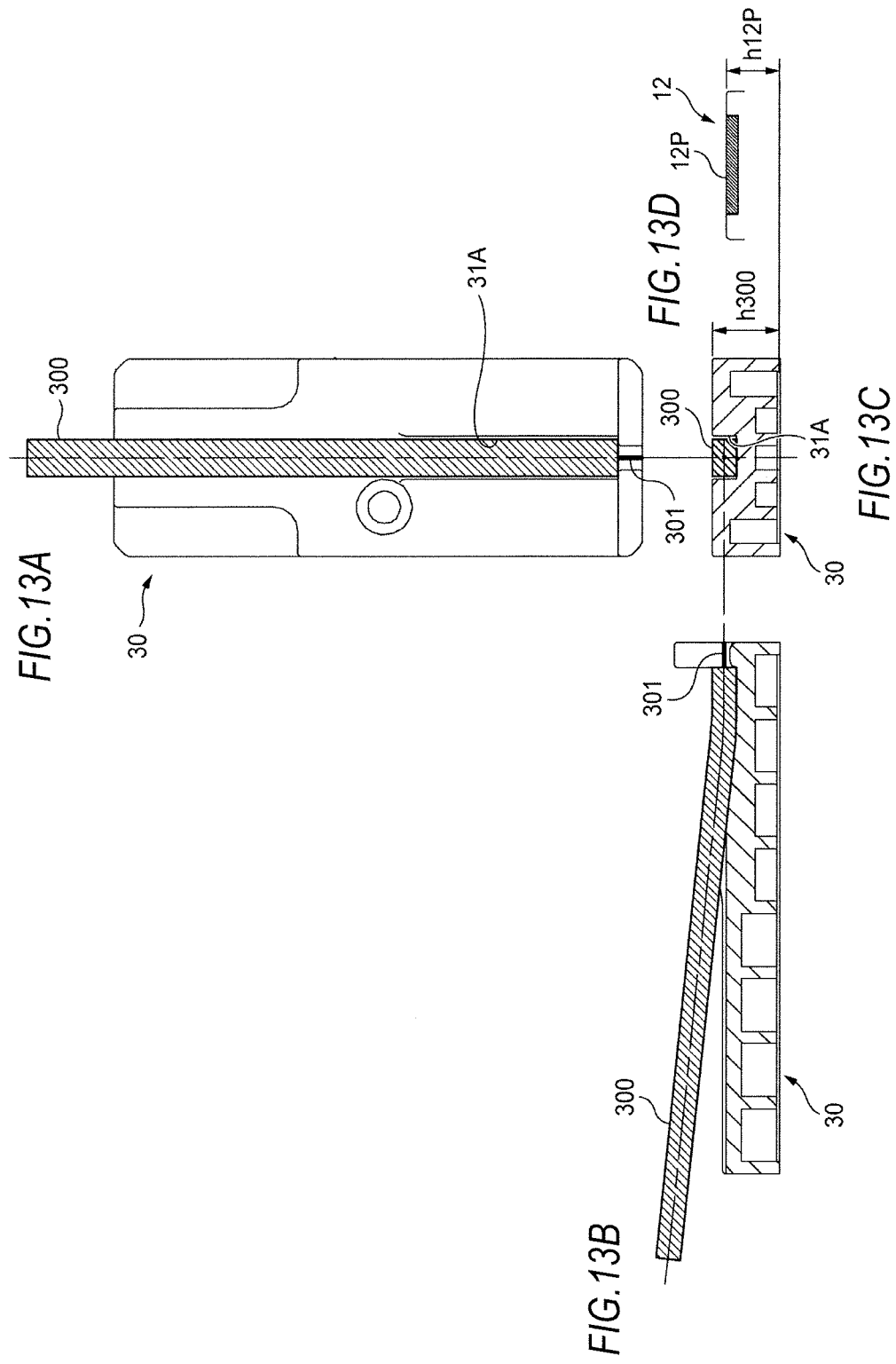

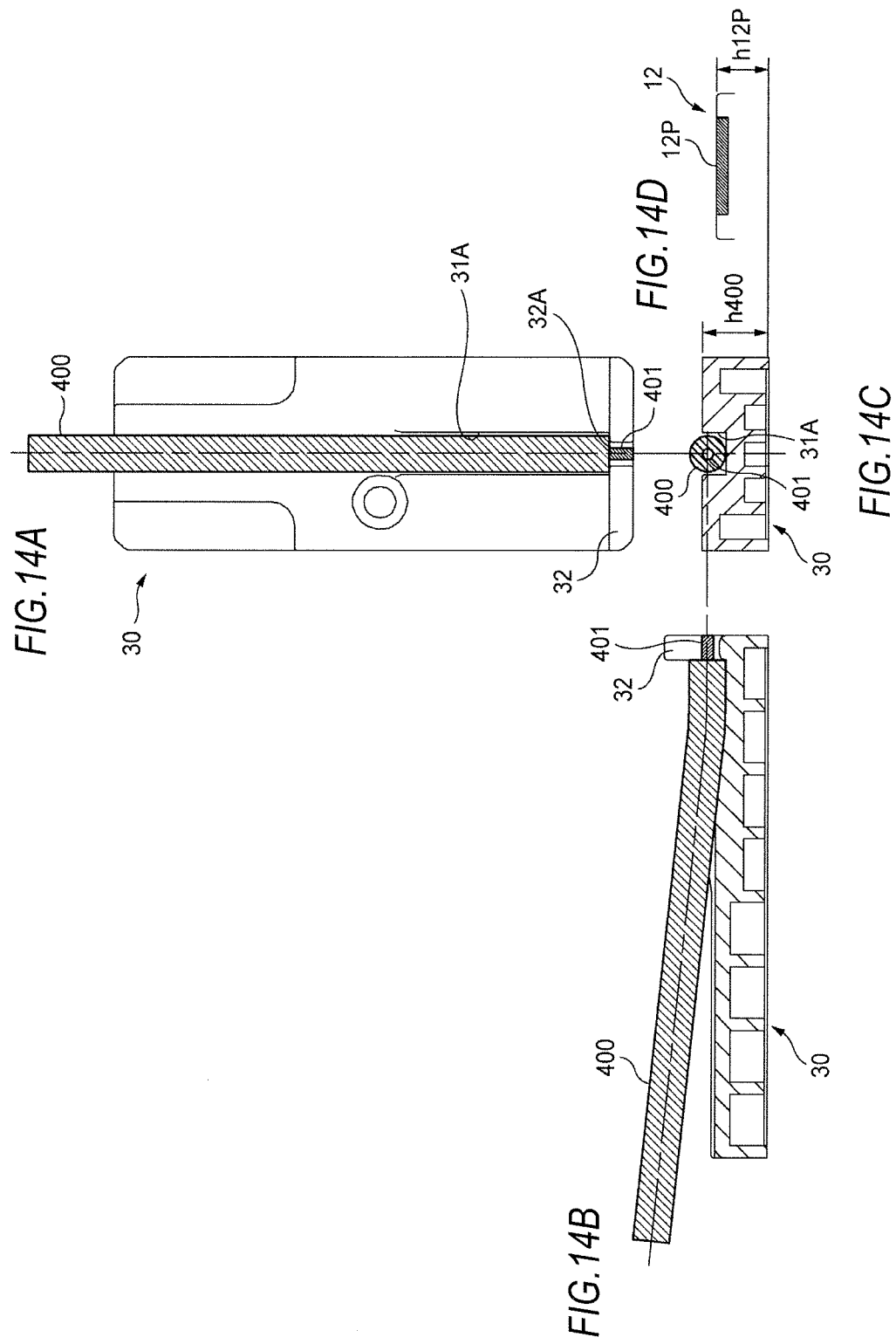

OPTICAL FIBER HOLDER AND OPTICAL FIBER CLEAVING APPARATUS TO WHICH OPTICAL FIBER HOLDER IS ATTACHABLE

CROSS-REFERENCE TO RELATED APPLICATION

The present application claims the benefit of priority of Japanese Patent Applications No. 2016-025134 filed on Feb. 12, 2016, the content of which is incorporated herein by reference.

TECHNICAL FIELD

The present invention relates to an optical fiber holder which holds an optical fiber and an optical fiber cleaving apparatus to which the optical fiber holder is attachable.

BACKGROUND ART

JP-A-06-51149 and JP-A-2005-249922 disclose optical fiber holders which hold an optical fiber and are attached to an optical fiber cleaving apparatus or an optical fiber splicing apparatus.

Specifically, JP-A-06-51149 discloses an optical fiber core wire holding apparatus, wherein a holding block formed with a V-shaped groove is accommodated in an accommodation recess of a holding frame body. The optical fiber core wire holding apparatus is used while accommodating a different holding block in the holding frame body depending on the outer diameter of the coating of the optical fiber core wire. That is, when accommodating optical fiber core wires which are different in outer diameter, it is necessary to replace the holding blocks.

JP-A-2005-249922 discloses an optical fiber holder including a first positioning groove that is formed on a base plate and a second positioning groove that is formed to have a larger width than the first positioning groove. In the optical fiber holder, positioning of two types of optical fiber ribbons (with 4 cores and 8 cores) which are different in width is carried out using the first positioning groove and the second positioning groove. However, with the optical fiber holder, positioning of an optical fiber in a longitudinal direction cannot be carried out.

SUMMARY OF THE INVENTION

Aspects of the present invention provide an optical fiber holder which can hold plural kinds of optical fibers with different outer diameters and is capable of positioning the optical fibers in a longitudinal direction and an optical fiber cleaving apparatus to which the optical fiber holder is attachable.

According to an embodiment of the present invention, there is provided an optical fiber holder which is configured to hold an optical fiber. The optical fiber holder includes a holder main body, a V-groove which is formed on an upper surface of the holder main body and configured to accommodate a first optical fiber, a recessed groove which is formed on a same straight line with the V-groove at a side closer to a termination portion of an optical fiber than the V-groove and configured to accommodate a second optical fiber, of which a coating portion has a larger outer diameter than that of the first optical fiber, and an abutting portion which is provided on an end portion of the recessed groove on an opposite side to the V-groove and includes an opening portion which has a smaller width than the recessed groove. When the second optical fiber is accommodated in the recessed groove, a fiber core wire of the second optical fiber protrudes to an outside via the opening portion and an end portion of the coating portion of the second optical fiber abuts on the abutting portion.

According to another embodiment of the present invention, there is provided an optical fiber cleaving apparatus which is configured to cleave a glass fiber portion exposed from an end portion of an optical fiber and to which the above optical fiber holder is attachable.

According to the above-described optical fiber holder and the optical fiber cleaving apparatus to which the optical fiber holder is attachable, it is possible to hold plural kinds of optical fibers with different outer diameters and to carry out positioning of the optical fibers in a longitudinal direction.

BRIEF DESCRIPTION OF DRAWINGS

The above and other aspects of the present invention will become more apparent and more readily appreciated from the following description of illustrative embodiments of the present invention taken in conjunction with the attached drawings, in which:

FIG. 11A is a plan view illustrating the optical fiber holder with a thin optical fiber being accommodated in a V-groove;

FIG. 11B is a vertical sectional view along a transverse direction of FIG. 11A;

FIG. 11C is a vertical sectional view along a longitudinal direction of FIG. 11A;

FIG. 11D is a view illustrating a lower clamping portion of the optical fiber cleaving apparatus;

FIG. 12A is a plan view illustrating the optical fiber holder with an optical fiber, which has a larger diameter than the optical fiber illustrated in FIGS. 11A to 11D, being accommodated in the V-groove;

FIG. 12B is a vertical sectional view along the transverse direction of FIG. 12A;

FIG. 12C is a vertical sectional view along the longitudinal direction of FIG. 12A;

FIG. 12D is a view illustrating the lower clamping portion of the optical fiber cleaving apparatus;

FIG. 13A is a plan view illustrating the optical fiber holder with a drop cable being accommodated in a recessed groove;

FIG. 13B is a transverse vertical sectional view of FIG. 13A;

FIG. 13C is a longitudinal vertical sectional view of FIG. 13A;

FIG. 13D is a view illustrating the lower clamping portion of the optical fiber cleaving apparatus;

FIG. 14A is a plan view illustrating the optical fiber holder with an optical fiber code being accommodated in a recessed groove;

FIG. 14B is a vertical sectional view along the transverse direction of FIG. 14A;

FIG. 14C is a vertical sectional view along the longitudinal direction of FIG. 14A; and FIG. 14D is a view illustrating the lower clamping portion of the optical fiber cleaving apparatus.

DETAILED DESCRIPTION

Description on Embodiments

Figure 1:
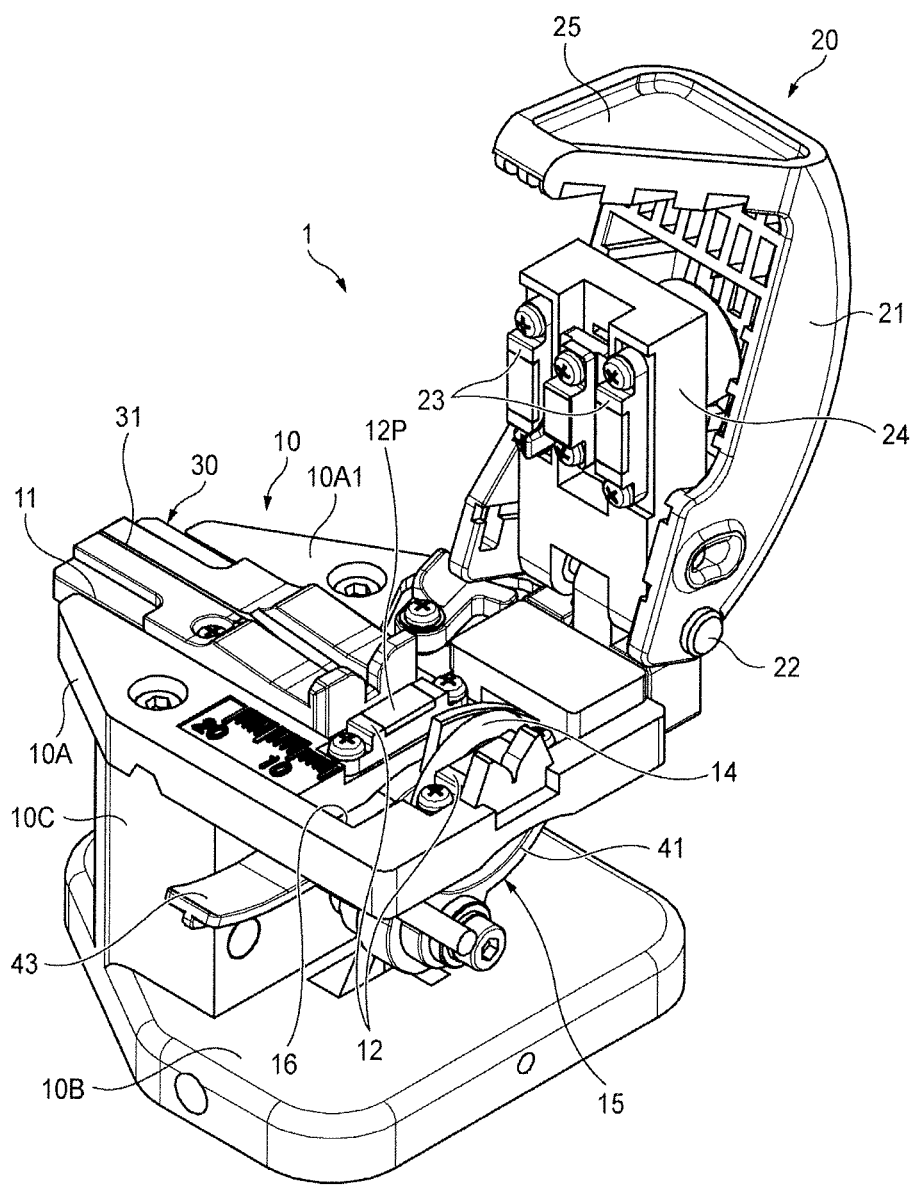
FIG. 1 is a front perspective view of an optical fiber cleaving apparatus and a holder attached thereto according to an embodiment of the present invention.

Embodiments of the present invention will be listed below.

(1) An embodiment of the present invention provides an optical fiber holder which is configured to hold an optical fiber and includes:

a holder main body;

a V-groove which is formed on an upper surface of the holder main body and configured to accommodate a first optical fiber;

a recessed groove which is formed on a same straight line with the V-groove at a side closer to a termination portion of an optical fiber than the V-groove and configured to accommodate a second optical fiber, of which a coating portion has a larger outer diameter than that of the first optical fiber; and an abutting portion which is provided on an end portion of the recessed groove on an opposite side to the V-groove and includes an opening portion which has a smaller width than the recessed groove, wherein when the second optical fiber is accommodated in the recessed groove, a fiber core wire of the second optical fiber protrudes to an outside via the opening portion and an end portion of the coating portion of the second optical fiber abuts on the abutting portion.

According to this configuration, it is possible to provide an optical fiber holder which can hold plural kinds of optical fibers with different outer diameters and is capable of positioning the optical fibers in a longitudinal direction. Particularly, since it is not necessary to replace the optical fiber holder and it is not necessary to change the attachment position of the optical fiber holder even if the kind of a cleaving target optical fiber is changed while the optical fiber holder is attached to an optical fiber cleaving apparatus or the like, it is possible to improve work efficiency.

(2) The abutting portion may include a protruding portion which protrudes upward from the holder main body.

According to this configuration, it is possible to reliably carry out positioning of an optical fiber in a longitudinal direction and to prevent fingers of a worker holding down an optical fiber from protruding to the outside of the optical fiber holder.

(3) The upper surface of the holder main body may include, at a portion where the recessed groove is formed, a first region which is parallel to a bottom surface of the holder main body and a second region which is a region closer to the V-groove than the first region and is inclined upward toward the V-groove.

According to this configuration, in the first region on the opening portion side, the optical fiber can be held to be parallel to the bottom surface, and with the second region inclined upward, it is possible to secure a sufficient depth for the V-groove.

(4) The holder main body may be formed with a downward inclined portion on the upper surface thereof in a vicinity of a boundary between the V-groove and the recessed groove, the downward inclined portion being inclined downward from the recessed groove toward the V-groove.

(5) The holder main body may be formed with stepped portions on the upper surface thereof, the stepped portions being cutout from side surfaces of the holder main body over a predetermined range from an end portion on an opposite side to the abutting portion.

According to this configuration, it becomes easy for a worker to hold the first optical fiber when accommodating the first optical fiber in the V-groove.

(6) Another embodiment of the present invention provides an optical fiber cleaving apparatus which is configured to cleave a glass fiber portion exposed from an end portion of an optical fiber and to which the optical fiber holder according to any one of (1) to (5) is attachable.

According to this configuration, it is not necessary to replace the optical fiber holder and it is not necessary to change the position of the optical fiber holder even in a case of cleaving plural kinds of optical fibers with different outer diameters, and thus it is possible to improve the efficiency of cleaving work.

Details of Embodiments

Hereinafter, embodiments of the present invention will be described with reference to the drawings in more detail. It is noted that in the description below, similar or corresponding components are given same reference numbers and a repetitive description will be omitted.

Figure 2:
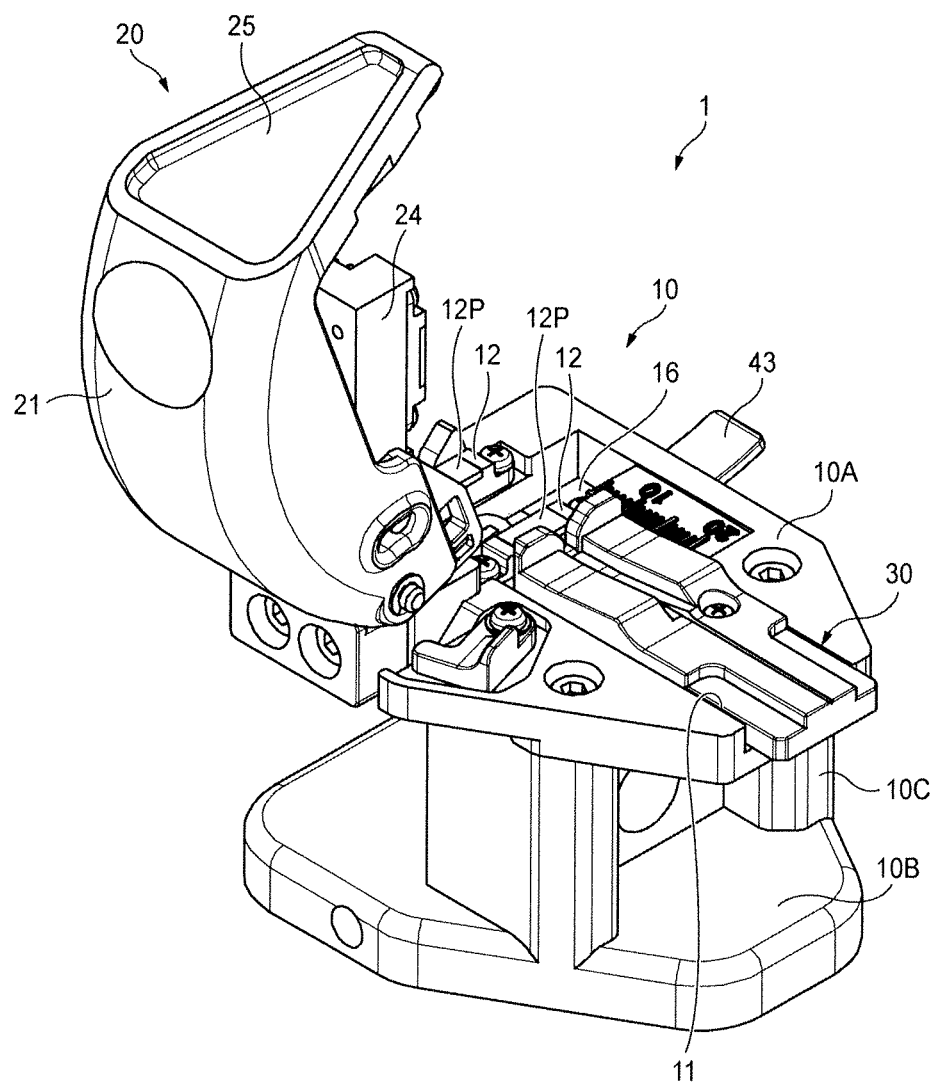
FIG. 2 is a rear perspective view of the optical fiber cleaving apparatus.
Figure 3:
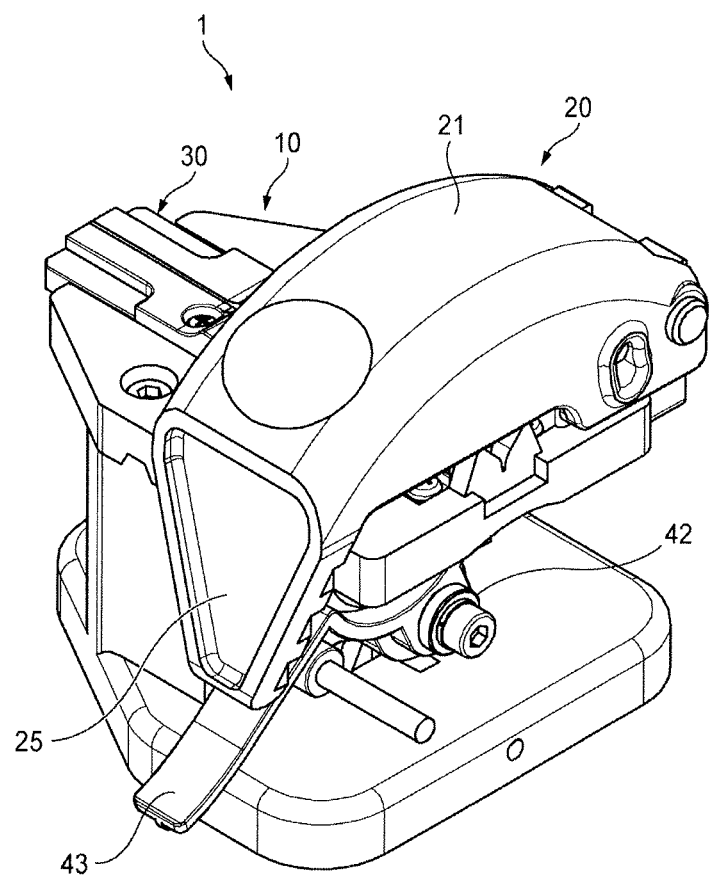
FIG. 3 is a front perspective view illustrating a state where a clamping cover of the optical fiber cleaving apparatus is closed.

FIGS. 1 and 2 are respectively a front perspective view and a rear perspective view of an optical fiber cleaving apparatus and a holder attached thereto according to an embodiment. FIG. 3 is a front perspective view illustrating a state where a clamping cover of the optical fiber cleaving apparatus is closed.

An optical fiber cleaving apparatus 1 includes a main body portion 10 and a clamping cover 20. The main body portion 10 includes a holder fixing portion 11, a lower fixing member 12, a blade member 14, and a holding member 15. The clamping cover 20 includes an arm member 21, a rotating member 22, an upper fixing member 23, an attachment member 24, and a lever pressing portion 25. The lower fixing member 12 of the main body portion 10 and the upper fixing member 23 of the clamping cover 20 constitute a clamping unit which is configured to clamp a glass fiber portion of an optical fiber (not shown).

The main body portion 10 is constituted by a top plate portion 10A, a bottom plate portion 10B, and a column portion 10C which connects the top plate portion 10A and the bottom plate portion 10B. On an upper surface 10A1 of the top plate portion 10A, the holder fixing portion 11 is provided. The holder fixing portion 11 is a recessed portion for fixing an optical fiber holder 30 (hereinafter, referred to as "holder 30") that is configured to hold an optical fiber with a protection coating portion thereof. On an upper surface of the holder 30, for example, a fiber accommodation groove 31 that can accommodate plural kinds of optical fibers with different outer diameters is provided. The configuration of the holder 30 will be described below in detail.

In a position on the upper surface 10A1 of the top plate portion 10A which faces the clamping cover 20, the lower fixing member 12 is fixed. The lower fixing member 12 is obtained by fitting a rubber member into an upper surface of a metallic base and is configured so that the glass fiber portion of the optical fiber is placed on an upper surface (hereinafter, referred to as "clamping surface 12P") of the rubber member.

An exposure hole 16 is formed between a pair of lower fixing members 12, and the blade member 14 protrudes upward from the exposure hole 16. The blade member 14 is held by the holding member 15, and the holding member 15 includes a blade holding portion 41, a rotation shaft 42, and a rotation lever 43. The holding member 15 is attached to the column portion 10C of the main body portion 10 using the rotation shaft 42, and the rotation lever 43 is provided to protrude laterally from the blade holding portion 41. When the rotation lever 43 moves vertically, the blade member 14 attached to the blade holding portion 41 moves around the rotation shaft 42 along an arc shape.

The clamping cover 20 includes the arm member 21 which is long and is provided to cover a region of the top plate portion 10A of the main body portion 10 in which the lower fixing member 12 and the blade member 14 are disposed. The arm member 21 is rotatably connected to the main body portion 10 through the rotating member 22. On a rear surface side of the arm member 21, the upper fixing member 23 is disposed being positioned to face the lower fixing member 12.

Figure 4:
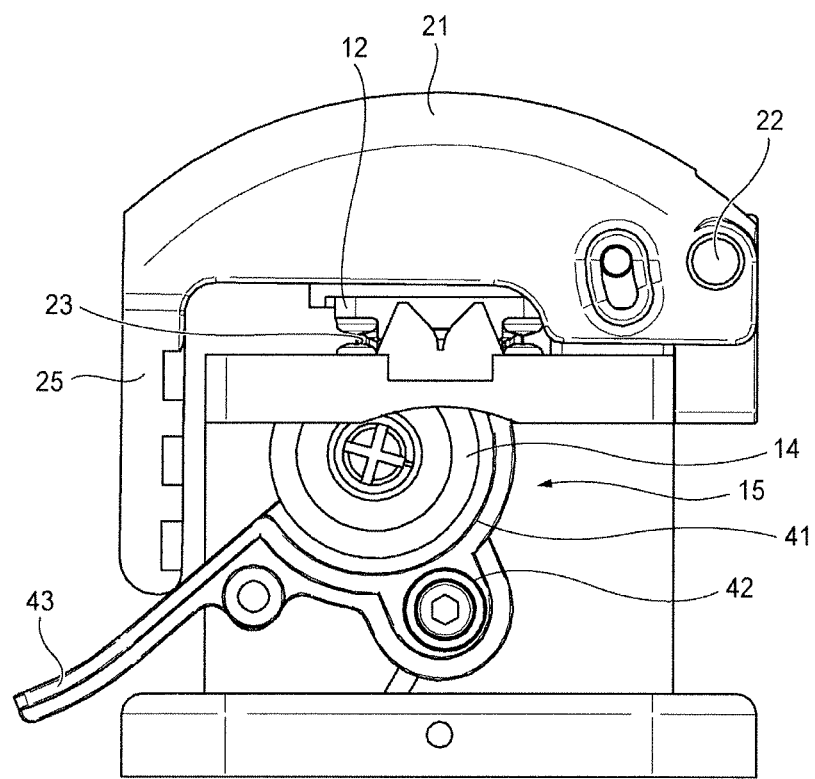
FIG. 4 is a right side view illustrating the state of FIG. 3.

The lever pressing portion 25 is provided on the opposite side of the rotating member 22 of the arm member 21 such that the lever pressing portion 25 protrudes from the arm member 21 toward the main body portion 10 side in a direction orthogonal to the arm member 21 when the arm member 21 is closed. As illustrated in FIGS. 3 and 4, when the clamping cover 20 is closed with respect to the main body portion 10, and the lever pressing portion 25 presses down the rotation lever 43, the blade member 14 moves along an arc shape. In this manner, it is possible to scribe the glass fiber portion of the optical fiber which is fixed by the upper and lower fixing members 12, 23.

Figure 5:
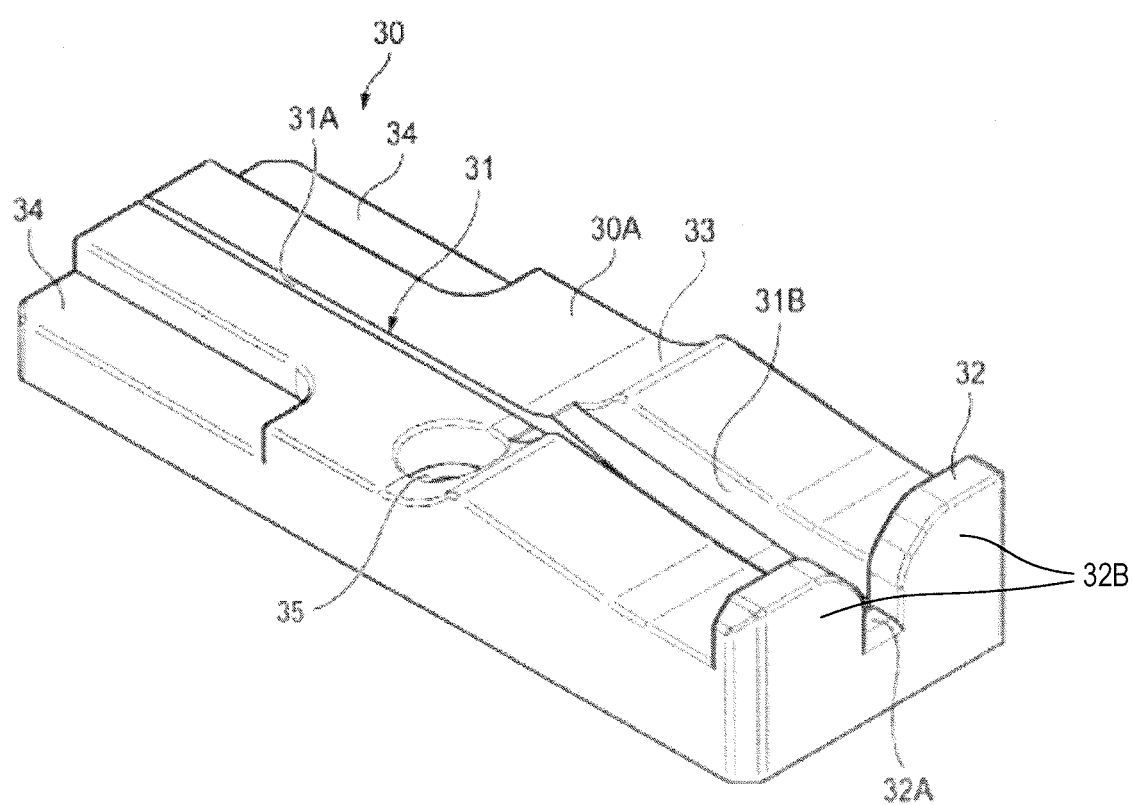
FIG. 5 is a perspective view of an optical fiber holder which is attached to the optical fiber cleaving apparatus.
Figure 6:
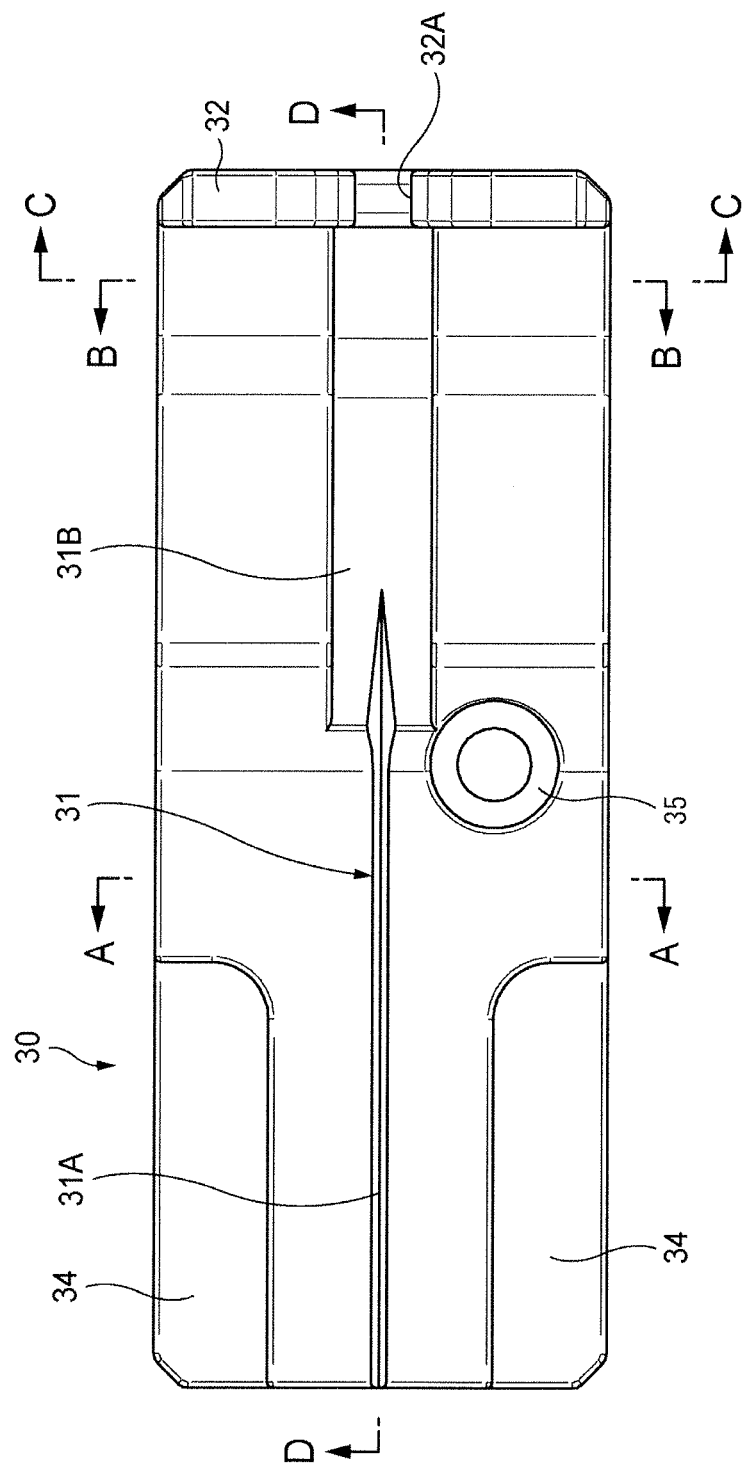
FIG. 6 is a plan view of the optical fiber holder in FIG. 5.

Next, a configuration of the holder 30, which is attached to the holder fixing portion 11 of the optical fiber cleaving apparatus 1 according to the embodiment, will be described with reference to FIGS. 5 to 10. FIG. 5 is a perspective view of the optical fiber holder which is attached to the optical fiber cleaving apparatus, and FIG. 6 is a plan view of the optical fiber holder in FIG. 5. FIGS. 7 to 10 are sectional views of the optical fiber holder in FIG. 6 taken along line A-A, line B-B, line C-C, and line D-D, respectively.

The fiber accommodation groove 31 is formed on an upper surface 30A of the holder (holder main body) 30. As illustrated in FIGS. 5 and 6, the fiber accommodation groove 31 is constituted by a V-groove 31A and a recessed groove 31B that is formed on the same straight line as the V-groove 31A and has a larger width than the V-groove 31A. The recessed groove 31B is formed to extend from an end portion side, which is close to a position at which the glass fiber portion of the optical fiber is cleaved (a termination portion of an optical fiber) when the optical fiber is accommodated in the holder 30 attached to the optical fiber cleaving apparatus 1, to a position close to the longitudinal center of the upper surface 30A. Meanwhile, the V-groove 31A is formed to extend from the position close to the longitudinal center of the upper surface 30A to an end portion on the opposite side to the termination portion of the optical fiber.

Figure 7:
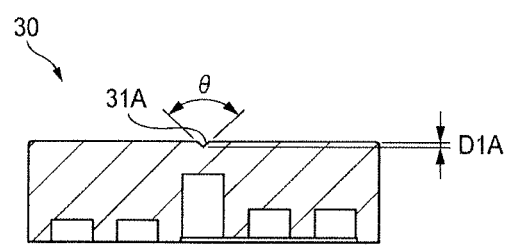
FIG. 7 is a sectional view of the optical fiber holder in FIG. 6 taken along line A-A.
Figure 8:
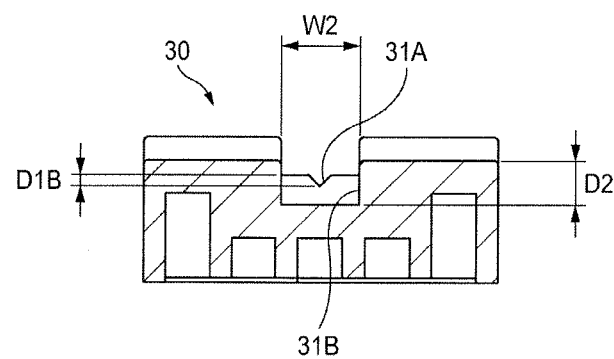
FIG. 8 is a sectional view of the optical fiber holder in FIG. 6 taken along line B-B.

As illustrated in FIG. 7, the V-groove 31A has a groove angle 0 of 90 degrees and a depth D1A of 0.28 mm, for example, and the V-groove 31A can accommodate an optical fiber core wire (an example of a first optical fiber) with an outer diameter of 0.25 mm or 0.9 mm. The V-groove 31A has an end portion extending into the recessed groove 31B, and as illustrated in FIG. 8, the depth D1B of the V-groove 31A in the recessed groove 31B is 0.51 mm. Meanwhile, as illustrated in FIG. 8, the recessed groove 31B has a width W2 of 3.5 mm and a depth D2 of 2.0 mm, and the recessed groove 31B can accommodate, for example, a drop cable or an optical fiber code (an example of a second optical fiber) of which a coating portion has a larger outer diameter than that of the optical fiber core wire.

Figure 9:
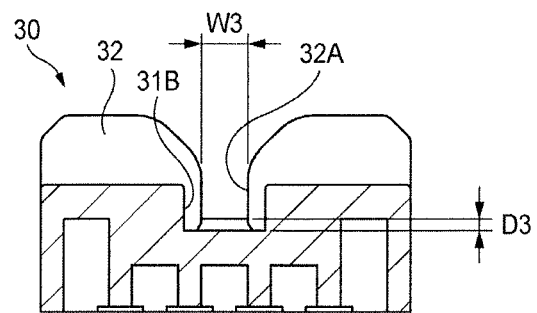
FIG. 9 is a sectional view of the optical fiber holder in FIG. 6 taken along line C-C.

An abutting portion 32 is formed on an end portion of the recessed groove 31B on the opposite side to the V-groove 31A, i.e. an end portion close to the termination portion of an optical fiber. The abutting portion 32 includes an opening portion 32A which has a smaller width than the recessed groove 31B and protrudes upward from the upper surface 30A, and a protruding portion 32B which protrudes upward from the holder main body 30. As illustrated in FIG. 9, the opening portion 32A has a width W3 of 2.0 mm, for example. In addition, a bottom surface of the opening portion 32A is provided in a slightly higher position than the bottom surface of the recessed groove 31D, and a height D3 which is a distance between the bottom surface of the recessed groove 31B and the bottom surface of the opening portion 32A is, for example, 0.5 mm. As described above, the abutting portion 32 includes the opening portion 32A of which an outer edge further protrudes to the inside than the recessed groove 31 B. Therefore, an end portion of a coating portion of the drop cable or the optical fiber code accommodated in the recessed groove 31B can be positioned with the end portion abutting on the abutting portion 32, and a fiber core wire exposed from the coating portion can protrude to the outside via the opening portion 32A.

Figure 10:
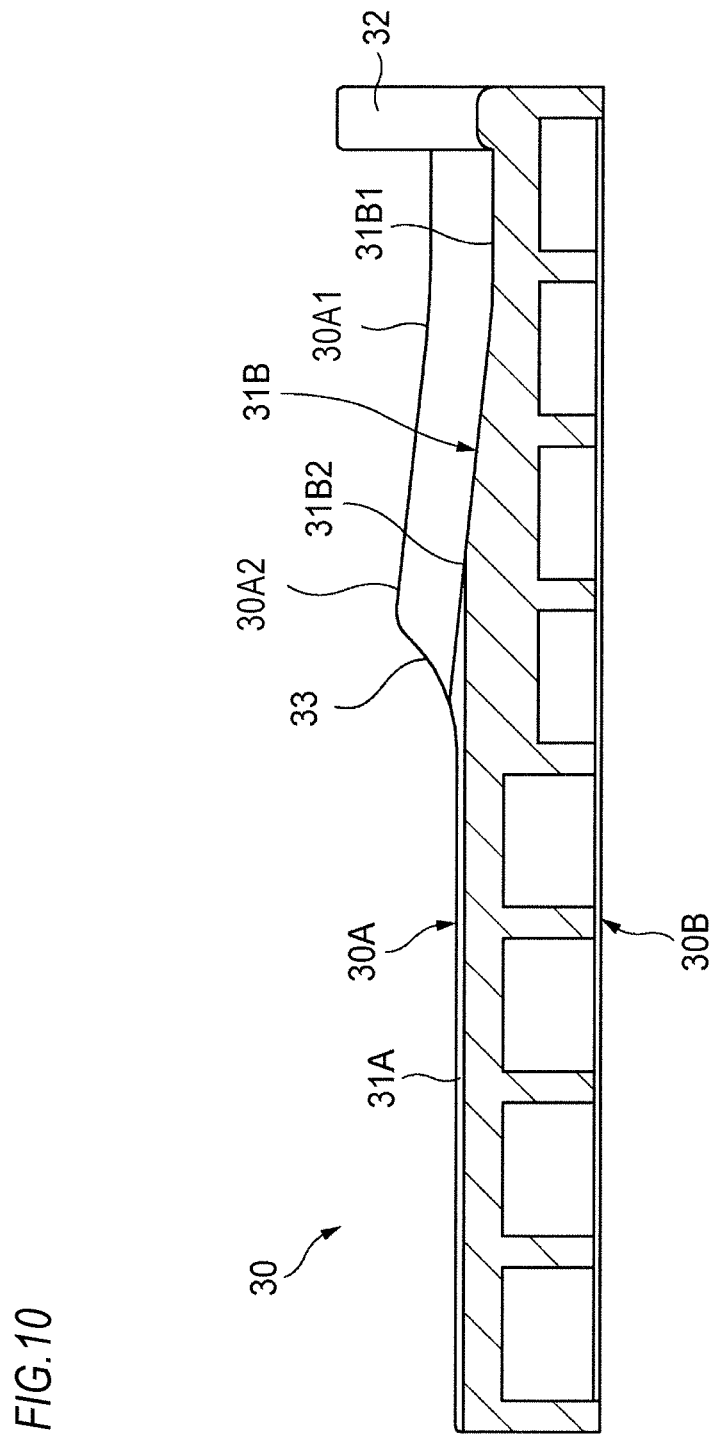
FIG. 10 is a sectional view of the optical fiber holder in FIG. 6 taken along line D-D.

As illustrated in FIG. 10, a portion of the upper surface 30A of the holder 30, on which the recessed groove 31B is formed, includes a first region 31A1 that is parallel to a bottom surface 30B and a second region 31A2 that is a region closer to the V-groove 31A than the first region 31A1 and is inclined upward toward the V-groove 31A. The bottom surface of the recessed groove 31B includes a first region 31B1 that is parallel to the first region 31A1 of the upper surface 30A and the bottom surface 30B of the holder 30, and a second region 31B2 that is parallel to the second region 31A2, that is, inclined upward toward the V-groove 31A. According to this configuration, in the first regions 31A1, 31B1 on the opening portion 32A side, the optical fiber can be held to be parallel to the bottom surface, and since the bottom surface of the recessed groove 31B includes the second region 31B2 inclined upward, it is possible to form the V-groove 31A and the recessed groove 31B on the same straight line and to secure a sufficient depth for the V-groove 31A.

Further, on the upper surface 30A, a downward inclined portion 33 that is inclined downward from the second region 31A2 toward the V-groove 31A is formed in the vicinity of a boundary between the V-groove 31A and the recessed groove 31B. Furthermore, on the upper surface 30A, stepped portions 34 which are cutout from side surfaces of the holder 30 are formed over a predetermined range from an end portion on the opposite side of the abutting portion 32. Since the downward inclined portion 33 and the stepped portions 34 are provided, it becomes easy for a worker to hold the optical fiber when accommodating the optical fiber in the V-groove 31A. It is noted that on the downward inclined portion 33, an attachment hole 35 for attaching the holder 30 to the holder fixing portion 11 of the optical fiber cleaving apparatus 1 with a screw or the like is formed.

FIGS. 11A to 14D illustrate a state where plural kinds of optical fibers with different outer diameters (optical fiber core wire, drop cable, optical fiber code, or the like) are accommodated in the holder 30 that is configured as described above.

FIGS. 11A to 11C illustrate a state where an optical fiber core wire 100 with an outer diameter of 0.25 mm is accommodated in the V-groove 31A of the holder 30, and FIG. 11D illustrates the clamping surface 12P of the lower fixing member 12 of the optical fiber cleaving apparatus 1. As illustrated in FIGS. 11A and 11B, in a case of cleaving the glass fiber portion of the thin optical fiber core wire 100, a worker holds down the optical fiber core wire 100 so that the optical fiber core wire 100 is accommodated in the V-groove 31A of the holder 30 which is attached to the holder fixing portion 11 of the optical fiber cleaving apparatus 1, causes a distal end of the optical fiber core wire 100 to protrude from the opening portion 32A, and places the glass fiber portion that is exposed from the distal end on the clamping surface 12P of the lower fixing member 12. At this time, as illustrated in FIGS. 11C and 11D, the center of the optical fiber core wire 100 accommodated in the V-groove 31A is positioned slightly higher than the clamping surface 12P of the lower fixing member 12. For example, a height h100 which is a distance between the bottom surface 30B of the holder 30 and the center of the optical fiber core wire 100 accommodated in the V-groove 31A is set to be slightly larger than a height h12P which is a distance between the same position as the bottom surface 30B and the clamping surface 12P. Accordingly, it is possible to appropriately place the glass fiber portion of the optical fiber core wire 100 on the clamping surface 12P and it is possible to prevent bending of the optical fiber core wire 100 which may occur when the optical fiber core wire 100 abuts on the other portion than the clamping surface 12P of the lower fixing member 12. Furthermore, it becomes easy to hold the optical fiber core wire 100 accommodated in the V-groove 31A with fingers placed on the downward inclined portion 33 that is formed in the vicinity of the boundary between the V-groove 31A and the recessed groove 31B on the upper surface 30A.

FIGS. 12A to 12C illustrate a state where an optical fiber core wire 200 with an outer diameter of 0.9 mm is accommodated in the V-groove 31A of the holder 30, and FIG. 12D illustrates the clamping surface 12P of the lower fixing member 12 of the optical fiber cleaving apparatus 1. As illustrated in FIGS. 12A and 12B, even in a case of cleaving the optical fiber core wire 200 which has a larger diameter than the optical fiber core wire 100, a worker holds down the optical fiber core wire 200 so that the optical fiber core wire 200 is accommodated in the V-groove 31A of the holder 30 which is attached to the holder fixing portion 11 of the optical fiber cleaving apparatus 1, causes a distal end of the optical fiber core wire 200 to protrude from the opening portion 32A, and places the glass fiber portion that is exposed from the distal end on the clamping surface 12P of the lower fixing member 12. At this time, as illustrated in FIGS. 12C and 12D, the center of the optical fiber core wire 200 accommodated in the V-groove 31A is positioned slightly higher than the clamping surface 12P of the lower fixing member 12. For example, a height h200 which is a distance between the bottom surface 30B of the holder 30 and the center of the optical fiber core wire 200 accommodated in the V-groove 31A is set to be slightly larger than the height h12P which is the distance between the same position as the bottom surface 30B and the clamping surface 12P. Accordingly, it is possible to appropriately place the glass fiber portion of the optical fiber core wire 200 on the clamping surface 12P and it is possible to prevent unexpected bending of the optical fiber core wire 200.

FIGS. 13A to 13C illustrate a state where a drop cable 300 with a width of 3 mm is accommodated in the recessed groove 31B of the holder 30, and FIG. 13D illustrates the clamping surface 12P of the lower fixing member 12 of the optical fiber cleaving apparatus 1. As illustrated in FIGS. 13A and 13B, in a case of cleaving the drop cable 300 of which a coating portion has a larger outer diameter than the optical fiber core wires 100 and 200, a worker holds down the drop cable 300 so that the drop cable 300 is accommodated in the recessed groove 31B of the holder 30 which is attached to the optical fiber cleaving apparatus 1. Then, the worker causes an end portion of the coating portion of the drop cable 300 to abut on the abutting portion 32, causes an optical fiber core wire 301 exposed from the coating portion of the drop cable 300 to protrude to the outside via the opening portion 32A, and places the glass fiber portion that is exposed from an end portion of the optical fiber core wire 301 on the lower fixing member 12. Since the coating portion of the drop cable 300 is caused to abut on the abutting portion 32 as described above, it is possible to reliably carry out positioning of the drop cable 300 in a longitudinal direction and to prevent fingers of the worker holding the drop cable 300 from protruding to the further outside than the abutting portion 32. In addition, at this time, as illustrated in FIGS. 13C and 13D, the center of the drop cable 300 accommodated in the recessed groove 31B is positioned slightly higher than the clamping surface 12P of the lower fixing member 12. For example, a height h300 which is a distance between the bottom surface 30B of the holder 30 and the center of the drop cable 300 accommodated in the recessed groove 31B is set to be slightly larger than the height h12P which is the distance between the same position as the bottom surface 30B and the clamping surface 12P. Accordingly, it is possible to appropriately place the optical fiber core wire 301 (glass fiber portion thereof) that is exposed from the drop cable 300 on the clamping surface 12P and it is possible to prevent bending of the optical fiber core wire 301 which may occur when the optical fiber core wire 301 abuts on the other portion than the clamping surface 12P of the lower fixing member 12.

FIGS. 14A to 14C illustrate a state where an optical fiber code 400 with an outer diameter of 3 mm is accommodated in the recessed groove 31B of the holder 30 and FIG. 14D illustrates the clamping surface 12P of the lower fixing member 12 of the optical fiber cleaving apparatus 1. As illustrated in FIGS. 14A and 14B, in a case of cleaving the optical fiber code 400 of which a coating portion has a larger outer diameter than the optical fiber core wires 100 and 200, a worker holds down the optical fiber code 400 so that the optical fiber code 400 is accommodated in the recessed groove 31B of the holder 30 which is attached to the optical fiber cleaving apparatus 1. Then, the worker causes an end portion of the coating portion of the optical fiber code 400 to abut on the abutting portion 32, causes an optical fiber core wire 401 exposed from the coating portion of the optical fiber code 400 to protrude to the outside via the opening portion 32A, and places the glass fiber portion that is exposed from an end portion of the optical fiber core wire 401 on the lower fixing member 12. Since the coating portion of the optical fiber code 400 is caused to abut on the abutting portion 32 as described above, it is possible to reliably carry out positioning of the optical fiber code 400 in a longitudinal direction and to prevent fingers of the worker holding down the optical fiber code 400 from protruding to the further outside than the abutting portion 32. In addition, at this time, as illustrated in FIGS. 14C and 14D, the center of the optical fiber code 400 accommodated in the recessed groove 31B is positioned slightly higher than the clamping surface 12P of the lower fixing member 12. For example, a height h400 which is a distance between the bottom surface 30B of the holder 30 and the center of the optical fiber core wire 401 of the optical fiber code 400 accommodated in the recessed groove 31B is set to be slightly larger than the height h12P which is the distance between the same position as the bottom surface 30B and the clamping surface 12P. Accordingly, it is possible to appropriately place the optical fiber core wire 401 (glass fiber portion thereof) that is exposed from the optical fiber code 400 on the clamping surface 12P and it is possible to prevent unexpected bending of the optical fiber core wire 401.

As described above, the holder 30 according to the embodiment includes the V-groove 31A that is formed on the upper surface 30A of the holder 30 and accommodates the optical fiber core wires 100, 200, the recessed groove 31B that is formed on the same straight line as the V-groove 31A being closer to the termination portion of the optical fiber than the V-groove 31A and accommodates the drop cable 300 or the optical fiber code 400 of which the coating portion has a larger outer diameter than that of the optical fiber core wires 100, 200, and the abutting portion 32 that is provided on the end portion of the recessed groove 31B on the opposite side to the V-groove 31A and includes the opening portion 32A which has a smaller width than the recessed groove 31B, and when the drop cable 300 or the optical fiber code 400 is accommodated in the recessed groove 31B, the optical fiber core wire 301 of the drop cable 300 or the optical fiber core wire 401 of the optical fiber code 400 protrudes to the outside via the opening portion 32A and an end portion of the protecting coating portion of the drop cable 300 or the optical fiber code 400 abuts on the abutting portion 32. According to this configuration, the holder 30 can hold plural kinds of optical fibers with different outer diameters and carry out positioning of the drop cable 300 or the optical fiber code 400 in a longitudinal direction. Therefore, since it is not necessary to replace the holder 30 and it is not necessary to change the attachment position of the holder 30 even if the kind of a cleaving target optical fiber is changed while the holder 30 is attached to the optical fiber cleaving apparatus 1, it is possible to improve work efficiency.

Although the present invention has been described above in detail referring to a specific embodiment, it is apparent to those skilled in the art that various changes or modifications can be made without departing from the spirit and scope of the invention. The number, the position, the shape, and the like of above-described components, is not limited to the above embodiment and those can be changed to a number, position, shape, and the like suitable in implementing the invention.

In the above-described embodiment, the holder 30 is attached to the optical fiber cleaving apparatus 1. However, the holder 30 may be used as a jacket remover or the like which removes coating on an end portion of an optical fiber cable to expose a fiber core wire.

The invention claimed is:

1. An optical fiber holder which is configured to hold an optical fiber, the optical fiber holder comprising:
 a holder main body;
 a V-groove which is formed on an upper surface of the holder main body and configured to accommodate a first optical fiber;
 a recessed groove which is formed on a same straight line with the V-groove at a side closer to a termination portion of the first optical fiber than the V-groove and configured to accommodate a second optical fiber, of which a coating portion has a larger outer diameter than that of the first optical fiber; and
 an abutting portion which is provided on an end portion of the recessed groove closer to the termination portion of the first optical fiber, on an opposite side to the V-groove and includes an opening portion which has a smaller width than the recessed groove,
 wherein when the second optical fiber is accommodated in the recessed groove, a fiber core wire of the second optical fiber protrudes to an outside via the opening portion and an end portion of the coating portion of the second optical fiber abuts on the abutting portion,
 wherein the recessed groove is formed between the V-groove and the abutting portion,
 wherein the abutting portion includes a protruding portion which protrudes upward from the holder main body,
 wherein the upper surface of the holder main body includes, at a portion where the recessed groove is formed, a first region which is parallel to a bottom surface of the holder main body and a second region which is a region closer to the V-groove than the first region and is inclined upward toward the V-groove,
 wherein the holder main body is formed with a downward inclined portion on the upper surface thereof in a vicinity of a boundary between the V-groove and the recessed groove, the downward inclined portion being inclined downward from the recessed groove toward the V-groove,
 wherein the holder main body is formed with stepped portions on the upper surface thereof, the stepped portions being cutout from side surfaces of the holder main body over a predetermined range from an end portion on an opposite side to the abutting portion, and
 wherein said end portion of the recessed groove is connected with the abutting portion and an other end portion of the recessed groove is connected with the V-groove.

2. An optical fiber cleaving apparatus which is configured to cleave a glass fiber portion exposed from an end portion of an optical fiber and to which the optical fiber holder according to claim 1 is attachable.

* * * * *